United States Patent
Wu et al.

(10) Patent No.: US 9,489,307 B2
(45) Date of Patent: Nov. 8, 2016

(54) MULTI DOMAIN BRIDGE WITH AUTO SNOOP RESPONSE

(71) Applicant: Texas Instruments Incorporated, Dallas, TX (US)

(72) Inventors: Daniel B Wu, Dallas, TX (US); Timothy D Anderson, University Park, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 567 days.

(21) Appl. No.: 14/031,390

(22) Filed: Sep. 19, 2013

(65) Prior Publication Data

US 2014/0115269 A1  Apr. 24, 2014

Related U.S. Application Data

(60) Provisional application No. 61/717,823, filed on Oct. 24, 2012.

(51) Int. Cl.
*G06F 13/40* (2006.01)
*G06F 12/08* (2016.01)
*G06F 13/16* (2006.01)

(52) U.S. Cl.
CPC ....... *G06F 12/0831* (2013.01); *G06F 12/0815* (2013.01); *G06F 13/1689* (2013.01); *G06F 13/4013* (2013.01); *G06F 13/4027* (2013.01); *G06F 2212/6042* (2013.01); *G06F 2212/621* (2013.01)

(58) Field of Classification Search
CPC ........... G06F 12/0815; G06F 13/4013; G06F 13/4027

USPC .......................................... 710/306, 314–315
See application file for complete search history.

(56) References Cited

U.S. PATENT DOCUMENTS

| | | | | |
|---|---|---|---|---|
| 7,197,578 B1 * | 3/2007 | Jacobs | ................... | G06F 1/3203 710/14 |
| 8,359,436 B2 * | 1/2013 | Vash | ................... | G06F 12/0815 711/146 |
| 8,448,001 B1 * | 5/2013 | Zhu | ........................ | G06F 1/3206 713/320 |
| 8,510,576 B2 * | 8/2013 | Tatsumi | ................... | G06F 1/26 307/18 |
| 8,725,953 B2 * | 5/2014 | Paver | ................... | G06F 12/0831 711/141 |
| 8,867,573 B2 * | 10/2014 | Kolinummi | ......... | G06F 13/4059 365/221 |
| 9,152,213 B2 * | 10/2015 | Yun | ........................ | G06F 1/3237 |
| 9,183,170 B2 * | 11/2015 | Jeong | ................... | G06F 13/405 |
| 2005/0273536 A1 * | 12/2005 | Mathewson | ........ | G06F 13/4059 710/110 |
| 2014/0122833 A1 * | 5/2014 | Davis | ................... | G06F 15/7803 712/29 |

* cited by examiner

*Primary Examiner* — Brian Misiura
(74) *Attorney, Agent, or Firm* — Robert D. Marshall, Jr.; Frank D. Cimino

(57) ABSTRACT

An asynchronous dual domain bridge is implemented between the cache coherent master and the coherent system interconnect. The bridge has 2 halves, one in each clock/powerdown domain—master and interconnect. The powerdown mechanism is isolated to just the asynchronous bridge implemented between the master and the interconnect with a basic request/acknowledge handshake between the master subsystem and the asynchronous bridge.

4 Claims, 1 Drawing Sheet

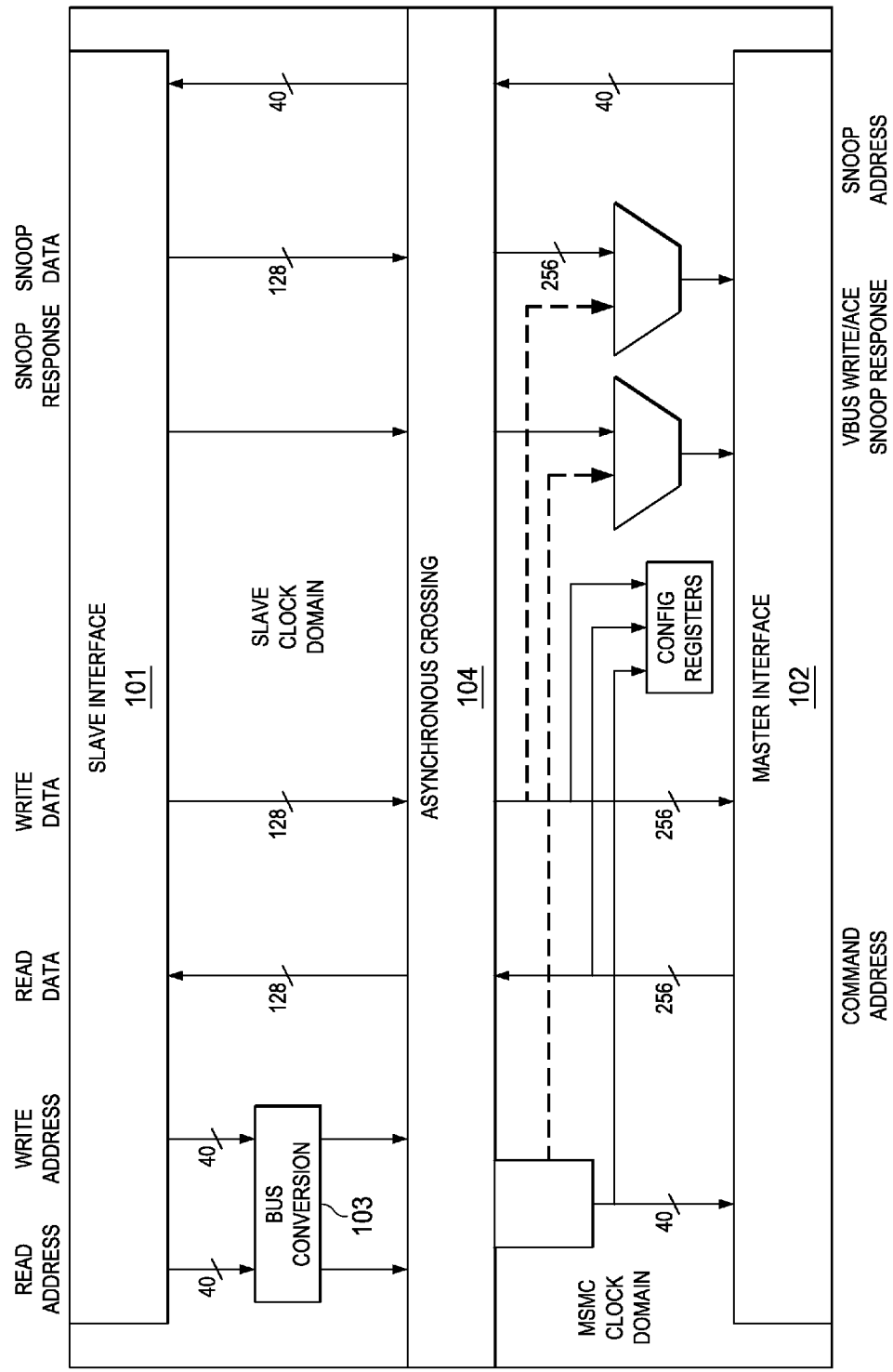

MULTI DOMAIN BRIDGE WITH AUTO SNOOP RESPONSE

CLAIM OF PRIORITY

This application claims priority under 35 U.S.C. 119(e)(1) to Provisional Application No. 61/717,823 filed 24 Oct. 2012.

TECHNICAL FIELD OF THE INVENTION

The technical field of this invention is interprocessor communications.

BACKGROUND OF THE INVENTION

In today's large SOCs that contain multiple compute cores, the cores can be running on different power domains (thus on separate PLLs) in order to gain full clock speed entitlement. However, there may be times when some of this compute power isn't necessary and could to be powered down in order to reduce the overall power consumption of the device.

If the unit being powered down is a cache coherent master in a cache coherent interconnect system, the transition of the master into a fully powered down non-responsive state needs to be well understood by the rest of the system and the interconnect. With regards to snoop transactions, the power down transition needs to ensure that hang situations are avoided:

1) snoop transactions may be dropped because the interconnect has already sent snoop transactions to the master before the interconnect has knowledge that the master is powering down
2) snoop responses may be dropped by the master if the power down mechanism doesn't anticipate that snoop transactions are still in the process of being serviced and simply powers down.

SUMMARY OF THE INVENTION

An asynchronous dual domain bridge is implemented between the cache coherent master and the coherent system interconnect. The bridge has 2 halves, one in each clock/powerdown domain—master and interconnect. The bridge uses a partial powerdown mode where its master-side domain half is able to powerdown with the master and the interconnect-side domain half remains active to auto-respond to snoop requests from the interconnect both during the master's powerdown sequence and subsequently after the master has fully powered-down. The bridge's auto snoop response mode automatically turns off once the master powers back up and comes out of reset. Similarly, if the device and system interconnect come out of reset, but the master remains in reset and possibly powers downs, the bridge detects this and also enters its auto snoop response mode.

BRIEF DESCRIPTION OF THE DRAWINGS

These and other aspects of this invention are illustrated in the drawings, in which:
FIG. 1 shows a block diagram of the dual-domain bridge.

DETAILED DESCRIPTION OF PREFERRED EMBODIMENTS

FIG. 1 shows an implementation of the asynchronous bridge operable to bridge different clock domains. Slave interface 101, operating in the slave clock domain is bridged to the master interface 102 operating in the Multicore Shared Memory Controller (MSMC) domain through asynchronous crossing 104. Since differences in data path width may exist between the master and slave interfaces, bus width conversion is performed in bus conversion unit 103 as needed.

The powerdown procedure implemented in the bridge is the following:

1) The cache coherent master subsystem produces a powerdown request signal, which propagates to the interconnect power domain portion of the bridge,
2) The bridge detects this and temporarily stops accepting snoop transactions from the coherent interconnect,
3) The bridge then waits for all already in-flight snoop commands to be drained by auto responding to them since the coherent master will have already drained out its caches by this point. The bridge does this by internally score boarding all snoop transactions as they are accepted from the interconnect. If the master does happen to send any snoop responses at this point, they are accepted and dropped by the bridge as the master cache is clean/empty at this point (i.e. the expected master snoop response is already known),
4) Once all in-flight snoop commands have been responded to the interconnect, the bridge sends the powerdown acknowledgement signal back across to the cache coherent master subsystem and simultaneously gates off all asynchronous transfer logic to prevent spurious signaling during the actual power gating/isolation transition,
5) Once the powerdown acknowledgement signal is sent, the bridge begins its auto snoop response mode where it generates "normal—no data" snoop responses for snoop commands from the interconnect.
6) For powerup, once the interconnect domain of the bridge detects a reset de-assertion transition from the cache coherent master subsystem domain, the bridge stops this auto snoop response mode and returns to its normal mode of passing snoop commands onto the attached cache coherent master and passing back the master's snoop response onto the coherent system interconnect.
7) Similarly, when the entire device/system-interconnect powers up and comes out of reset, but the master is held in reset and possibly powered down without going into a functional non-reset mode, the bridge detect this and enters its auto snoop response mode immediate upon the interconnect domain coming out of reset.

This solution provides a very simplistic approach to the powerdown of a cache coherent master in a coherent interconnect system that eliminates the need to make the interconnect aware of the powerdown mode the cache coherent master is about to enter. Having to make the interconnect aware of the master powering down, requires either that the interconnect has to resolve in-flight snoop transactions already sent before the interconnect has observed the powerdown hint from the master or that the master has to be able to service all snoop responses even during the powerdown sequence.

The described solution allows the interconnect to be simplified by never having to comprehend the powerdown nature of the cache coherent master and having the guarantee that snoop transactions will always be responded to. The master can also be simplified knowing that it can safely powerdown irrespective of whether there are still snoop transactions being serviced by its logic.

Lastly, on powerup, the interconnect and master do not need to share any powerup information between them, the bridge seamlessly transitioning back to the snoop transaction pass through mode when it detects that the master has powered-up and came out of reset.

What is claimed is:

1. An asynchronous bridge operable to connect a plurality of clock and powerdown domains, consisting of:
   a slave interface operable within a slave clock and powerdown domain;
   a master interface operable within a master clock and powerdown domain;
   an asynchronous crossing connected to said slave interface and said master interface;
   wherein upon detecting a powerdown request from a master device connected to said master interface said asynchronous bridge is operable to
      stop accepting snoop transactions from a slave device connected to said slave interface,
      automatically responding to in-flight snoop transactions by internally score boarding said in-flight snoop transactions,
      following automatically responding to all said in-flight snoop transactions, transmitting a powerdown acknowledge signal to the connected master device and powering down said master interface, and
      following transmitting said powerdown acknowledge signal, automatically responding to snoop requests with a "normal—no data" snoop response while said master interface is in a powerdown mode.

2. The asynchronous bridge of claim 1 wherein:
the slave interface is operable to remain active while the master interface is powered down.

3. The asynchronous bridge of claim 1 wherein:
the automatically responding to snoop requests with a "normal—no data" snoop response terminates upon detection by the asynchronous bridge that the master interface has powered up and came out of the reset state.

4. The asynchronous bridge of claim 1 wherein:
the asynchronous bridge automatically responding to snoop requests with a "normal—no data" snoop response upon system power up with the master held in reset.

\* \* \* \* \*